(12) United States Patent
Sakamoto

(10) Patent No.: US 11,961,973 B2
(45) Date of Patent: Apr. 16, 2024

(54) ALL-SOLID-STATE SECONDARY BATTERY

(71) Applicant: TOYOTA JIDOSHA KABUSHIKI KAISHA, Toyota (JP)

(72) Inventor: Ryuto Sakamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 17/533,725

(22) Filed: Nov. 23, 2021

(65) Prior Publication Data

US 2022/0173440 A1    Jun. 2, 2022

(30) Foreign Application Priority Data

Nov. 30, 2020   (JP) ................................ 2020-198278

(51) Int. Cl.
*H01M 10/0585* (2010.01)
*H01M 4/02* (2006.01)
*H01M 10/0525* (2010.01)

(52) U.S. Cl.
CPC ... *H01M 10/0585* (2013.01); *H01M 10/0525* (2013.01); *H01M 2004/028* (2013.01)

(58) Field of Classification Search
CPC .... H01M 10/0585; H01M 4/366; H01M 4/62; H01M 10/0525
See application file for complete search history.

(56) References Cited

U.S. PATENT DOCUMENTS

| 6,096,456 A | 8/2000 | Takeuchi et al. |
| 2017/0207482 A1 | 7/2017 | Tomura et al. |

(Continued)

FOREIGN PATENT DOCUMENTS

| JP | H09-153354 A | 6/1997 |
| JP | 2017130281 A | 7/2017 |
| JP | 2018045070 | * 9/2019 |

(Continued)

OTHER PUBLICATIONS

Okuyama; Tomoyuki, Secondary Battery, Electronic Device, and Manufacturing Method of Secondary Battery, Sep. 19, 2019, Description and Drawing translations for JP-2019160543-A. Global Dossier. (Year: 2019).*

*Primary Examiner* — Maria Laios
*Assistant Examiner* — Zackary Richard Cochenour
(74) *Attorney, Agent, or Firm* — Dinsmore & Shohl LLP

(57) ABSTRACT

The all-solid-state secondary battery of the disclosure comprises a positive electrode collector layer, a positive electrode layer, a solid electrolyte layer, a negative electrode layer and a negative electrode collector layer stacked in that order, wherein the positive electrode layer has a positive electrode active material layer and an insulating layer disposed around the perimeter edges of the positive electrode active material layer, and when the all-solid-state secondary battery is viewed from the stacking direction, the outer edges of the positive electrode active material layer on the solid electrolyte layer side are further inward than the outer edges of the positive electrode active material layer on the positive electrode collector layer side, and the outer edges of the positive electrode collector layer are further inward than the outer edges of the positive electrode active material layer on the positive electrode collector layer side.

9 Claims, 7 Drawing Sheets

(56) References Cited

U.S. PATENT DOCUMENTS

2020/0076002 A1\* 3/2020 Okamoto .......... H01M 10/0585
2020/0313229 A1 10/2020 Haga et al.

FOREIGN PATENT DOCUMENTS

KR 20200018147 A \* 2/2020
WO 2019103008 A1 5/2019
WO WO-2019153269 A1 \* 8/2019

\* cited by examiner

ALL-SOLID-STATE SECONDARY BATTERY

CROSS-REFERENCE TO RELATED APPLICATION

This application claims priority to Japanese Patent Application No. 2020-198278 filed on Nov. 30, 2020, incorporated herein by reference in its entirety.

TECHNICAL FIELD

The present disclosure relates to an all-solid-state secondary battery.

BACKGROUND

All-solid-state secondary batteries in which the electrolyte solution is replaced with solid electrolyte powder have become a subject of interest in recent years. Compared to secondary batteries which use electrolyte solutions, all-solid-state secondary batteries that do not use electrolyte solutions have high cycle durability and do not produce electrolyte solution decomposition.

The known all-solid-state secondary batteries include the type produced by the method in PTL 1, and the battery disclosed in PTL 2.

PTL 1 discloses a production method in which a first active material layer is formed on both sides of a first current collector, a solid electrolyte layer is formed on the first active material layer, a second active material layer is transferred onto the solid electrolyte layer, and finally a second current collector is disposed on the second active material layer. The publication discloses using an insulating material as a second current collector disposed on the outer edge sections of a layered surface, and placing the second current collector in a manner so that the second active material layer is situated at the center surrounded by the insulating material.

PTL 2 discloses an all-solid-state secondary battery having the outer edges of a positive electrode active material layer, a solid electrolyte layer and a negative electrode active material layer covered with an insulating resin sealing compound.

CITATION LIST

Patent Literature

[PTL 1] Japanese Unexamined Patent Publication No. 2017-130281

[PTL 2] Japanese Unexamined Patent Publication HEI No. 9-153354

SUMMARY

Technical Problem

In the method of forming an active material layer by transfer onto a solid electrolyte layer from a transfer substrate, as disclosed in PTL 1, for example, the active material layer is set in contact with the solid electrolyte layer and is transferred onto the solid electrolyte layer. The method of forming the active material layer on the transfer substrate may be coating and drying of an active material slurry onto the transfer substrate. The active material layer formed by this method is rounded at the outer edges due to surface tension of the slurry.

When such an active material layer is transferred onto a solid electrolyte layer, the outer edges of the active material layer on the solid electrolyte layer side are often shifted inward from the outer edges of the active material layer on the current collector layer side, as seen from the stacking direction of the all-solid-state secondary battery.

The present inventors have studied all-solid-state secondary batteries in which the active material layer, and especially the outer edges on the solid electrolyte layer side of the positive electrode active material layer, are shifted inward from the outer edges of the active material layer on the current collector layer side, as seen from the stacking direction, and have investigated methods of improving their durability. The term "durability" used here means the property of resistance to reduction in charge capacity and discharge capacity with repeated charge-discharge.

It is an object of the present disclosure to provide an all-solid-state secondary battery with high durability.

Solution to Problem

The present inventors have found that the aforementioned object can be achieved by the following means:

<Aspect 1>

An all-solid-state secondary battery comprising a positive electrode collector layer, a positive electrode layer, a solid electrolyte layer, a negative electrode layer and a negative electrode collector layer stacked in that order, wherein:

the positive electrode layer has a positive electrode active material layer and an insulating layer disposed around the perimeter edges of the positive electrode active material layer, and when the all-solid-state secondary battery is viewed from the stacking direction, the outer edges of the positive electrode active material layer on the solid electrolyte layer side are further inward than the outer edges of the positive electrode active material layer on the positive electrode collector layer side, and the outer edges of the positive electrode collector layer are further inward than the outer edges of the positive electrode active material layer on the positive electrode collector layer side.

<Aspect 2>

The all-solid-state secondary battery according to aspect 1, wherein:

when the all-solid-state secondary battery is viewed from the stacking direction, the outer edges of the positive electrode collector layer are further inward than the outer edges of the positive electrode active material layer on the solid electrolyte layer side.

<Aspect 3>

The all-solid-state secondary battery according to aspect 2, wherein in an arbitrary cross-section in the stacking direction of the all-solid-state secondary battery, with:

x mm denoting the shortest distance in the direction of the plane formed by an extension of the positive electrode active material layer on the positive electrode collector layer side and an extension of the positive electrode collector layer, and y mm denoting the shortest distance in the direction of the plane formed by an extension of the positive electrode active material layer on the positive electrode collector layer side and an extension of the positive electrode active material layer on the solid electrolyte layer side, the following inequality (1) is satisfied:

$$\text{Electron conductivity of positive electrode active material} \quad (1)$$
$$\text{layer } (mS/\text{cm}) \times (x-y)/\text{lithium ion conductivity of}$$
$$\text{positive electrode active material layer } (mS/\text{cm}) \leq 450.0$$

(where x>0.0, y>0.0 and x−y>0.0).

<Aspect 4>

The all-solid-state secondary battery according to aspect 3, wherein 5.0>x>0.0.

<Aspect 5>

The all-solid-state secondary battery according to aspect 3 or 4, wherein 5.0>y>0.0.

<Aspect 6>

The all-solid-state secondary battery according to any one of aspects 3 to 5, wherein the electron conductivity is 1.000 to 200.000 mS/cm.

<Aspect 7>

The all-solid-state secondary battery according to any one of aspects 3 to 6, wherein the lithium ion conductivity is 0.001 to 0.500 mS/cm.

<Aspect 8>

The all-solid-state secondary battery according to any one of aspects 1 to 7, wherein the ratio of the capacity of the negative electrode layer with respect to the capacity of the positive electrode layer is 2.5 or greater.

<Aspect 9>

The all-solid-state secondary battery according to any one of aspects 1 to 8, which is a lithium ion secondary battery.

<Aspect 10>

The all-solid-state secondary battery according to aspect 9, wherein the voltage of the negative electrode layer in the fully charged state is 0.5 V v.s. Li/Li$^+$ or lower.

Advantageous Effects of Present Disclosure

According to the present disclosure it is possible to provide an all-solid-state secondary battery with high durability.

DETAILED DESCRIPTION

Figure 1:
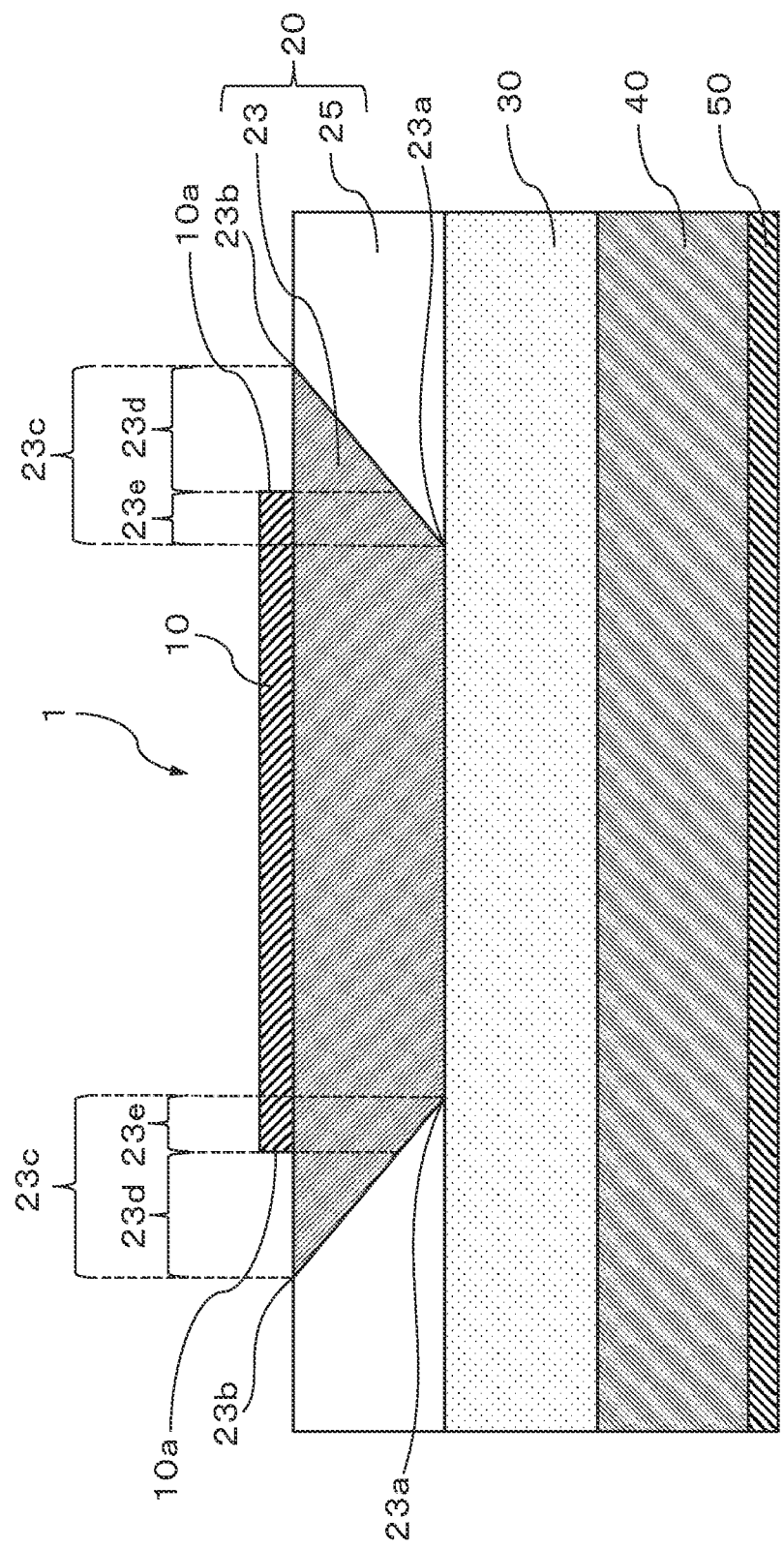
FIG. 1 is a cross-sectional view of an all-solid-state secondary battery 1 according to a first embodiment of the disclosure in the stacking direction.

Embodiments of the disclosure will now be described in detail. The disclosure is not limited to the embodiments described below, however, and various modifications may be implemented which do not depart from the gist thereof.

The all-solid-state secondary battery of the disclosure comprises a positive electrode collector layer, a positive electrode layer, a solid electrolyte layer, a negative electrode layer and a negative electrode collector layer stacked in that order, wherein: the positive electrode layer has a positive electrode active material layer and an insulating layer disposed around the perimeter edges of the positive electrode active material layer, and when the all-solid-state secondary battery is viewed from the stacking direction, the outer edges of the positive electrode active material layer on the solid electrolyte layer side are further inward than the outer edges of the positive electrode active material layer on the positive electrode collector layer side, and the outer edges of the positive electrode collector layer are further inward than the outer edges of the positive electrode active material layer on the positive electrode collector layer side.

The all-solid-state secondary battery of the disclosure may be a lithium ion secondary battery, for example.

The voltage of the negative electrode layer of the all-solid-state secondary battery of the disclosure may be 0.5 V v.s. Li/Li$^+$ or lower in the fully charged state. The voltage of the negative electrode layer of the all-solid-state secondary battery of the disclosure may also be 0.0 V v.s. Li/Li$^+$ or higher in the fully charged state. The voltage of the negative electrode layer of the all-solid-state secondary battery of the disclosure in the fully charged state may be 0.5 V v.s. Li/Li$^+$ or lower, 0.4 V v.s. Li/Li$^+$ or lower or 0.3 V v.s. Li/Li$^+$ or lower, and 0.0 V v.s. Li/Li$^+$ or higher, 0.1 V v.s. Li/Li$^+$ or higher or 0.2 V v.s. Li/Li$^+$ or higher.

In addition, the ratio of the capacity of the negative electrode layer with respect to the capacity of the positive electrode layer in the all-solid-state secondary battery of the disclosure may be 2.5 or greater. The ratio of the capacity of the negative electrode layer with respect to the capacity of the positive electrode layer may also be 5.0 or lower. The ratio of the capacity of the negative electrode layer with respect to the capacity of the positive electrode layer may be 2.5 or higher, 2.7 or higher or 3.0 or higher, and 5.0 or lower, 4.5 or lower or 4.0 or lower.

In an all-solid-state secondary battery in which the outer edges of the positive electrode active material layer on the solid electrolyte layer side are further inward than the outer edges of the positive electrode active material layer on the positive electrode collector layer side as seen from the stacking direction, lithium ions generated from the positive electrode active material, distributed at the outer edge sections of the positive electrode active material layer, often become concentrated near the outer edges at the interface between the positive electrode active material layer and solid electrolyte layer during charge.

When lithium ions become concentrated near the outer edges at the interface between the positive electrode active material layer and the solid electrolyte layer, lithium dendrites tend to form directly below the areas of the negative electrode active material layer near the outer edges at the interface between the positive electrode active material layer and solid electrolyte layer.

Such an all-solid-state secondary battery is therefore considered to be prone to internal short circuiting with repeated use, due to formation of lithium dendrites.

This will be more concretely described with reference to FIG. 3 and FIG. 4.

Figure 3:
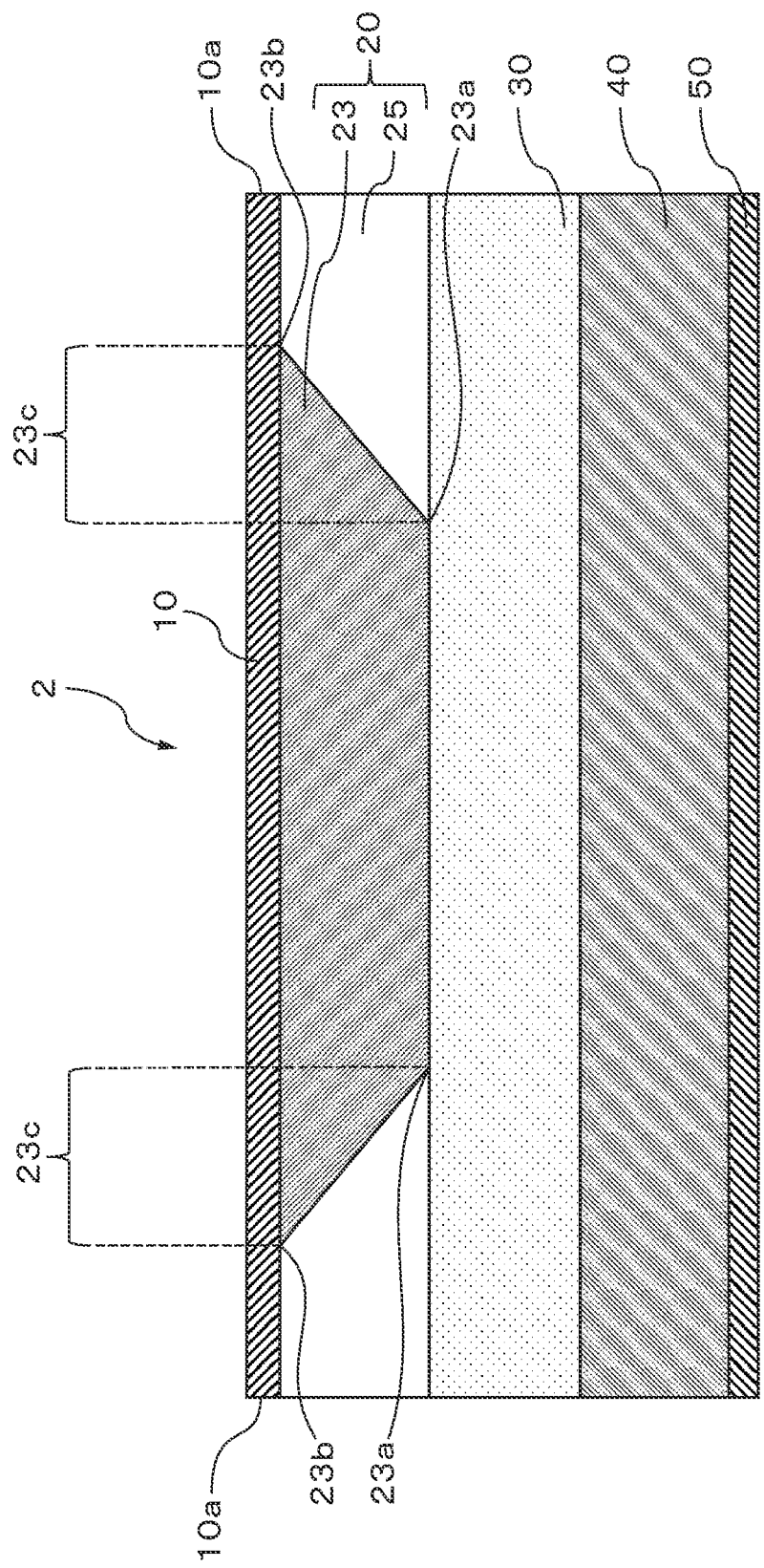
FIG. 3 is a cross-sectional view of an all-solid-state secondary battery 2 different from the embodiment of the disclosure, in the stacking direction.

FIG. 3 is a cross-sectional view of an all-solid-state secondary battery 2 different from the embodiment of the disclosure, in the stacking direction. As shown in FIG. 3, an all-solid-state secondary battery 2, which is different from the embodiment of the disclosure, has a construction in which a positive electrode collector layer 10, a positive electrode layer 20, a solid electrolyte layer 30, a negative electrode layer 40 and a negative electrode collector layer 50 are stacked in that order. The positive electrode layer 20 has a positive electrode active material layer 23 and an insulating layer 25 disposed around the perimeter edges of the positive electrode active material layer 23. The outer edges 10a of the positive electrode collector layer 10 are further outward than the outer edges 23b of the positive electrode active material layer 23 on the positive electrode collector layer 10 side. The excess portion 23c between the outer edges 23b of the positive electrode active material layer 23 on the positive electrode collector layer 10 side and the outer edges 23a of the positive electrode active material layer 23 on the solid electrolyte layer 30 side are entirely overlapping with the positive electrode collector layer 10, as seen from the stacking direction.

The positive electrode active material layer 23 includes a positive electrode active material, and the negative electrode layer 40 includes a negative electrode active material.

Figure 4:
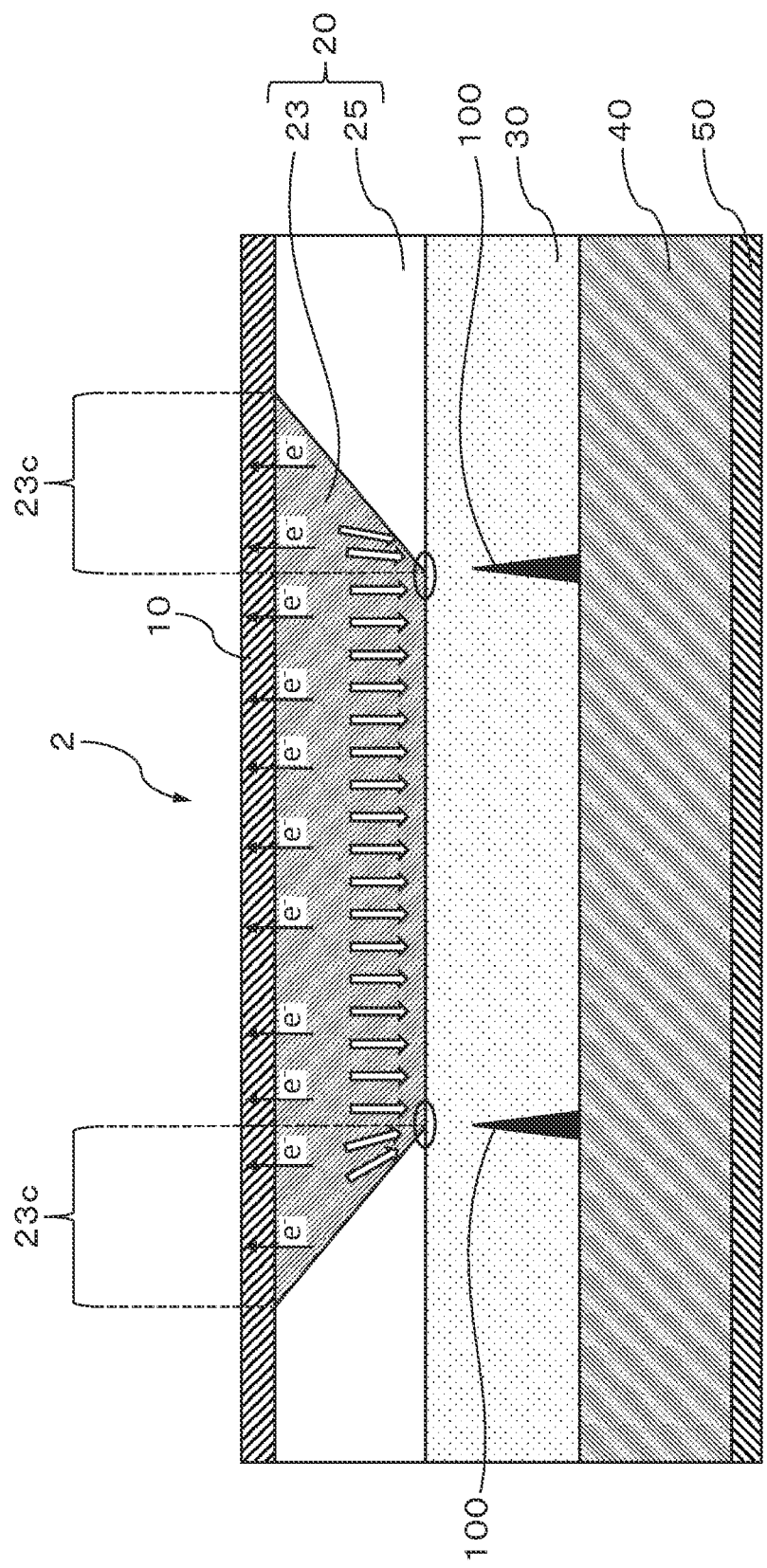
FIG. 4 is a schematic diagram of an all-solid-state secondary battery 2 different from the embodiment of the disclosure, showing its charging state.

FIG. 4 is a schematic diagram of an all-solid-state secondary battery 2 different from the embodiment of the disclosure, showing its charging state.

As shown in FIG. 4, upon charging of the all-solid-state secondary battery 2 which is different from the embodiment of the disclosure, electrons migrate from the positive electrode active material in the positive electrode active material layer 23 toward the positive electrode collector layer 10, as indicated by the black arrows. At the same time, lithium ions migrate from the positive electrode active material in the positive electrode active material layer 23 toward the negative electrode layer 40, as indicated by the white arrows.

In the all-solid-state secondary battery 2 which differs from the embodiment of the disclosure, the positive electrode collector layer 10 is disposed on the excess portion 23c. Even in the excess portion 23c, therefore, electrons migrate from the positive electrode active material toward the positive electrode collector layer 10, while lithium ions migrate from the positive electrode active material in the positive electrode active material layer 23 toward the negative electrode layer 40, as indicated by the white arrows.

Lithium ion therefore becomes concentrated near the outer edges at the interface between the positive electrode active material layer 23 and the solid electrolyte layer 30, and specifically at the sections surrounding by the ellipses. When charge-discharge is repeated, this tends to cause formation of lithium dendrites 100 directly under the areas of the negative electrode layer 40 near the outer edges at the interface between the positive electrode active material layer 23 and solid electrolyte layer 30.

In the all-solid-state secondary battery of the disclosure, however, the outer edges of the positive electrode collector layer are further inward than the outer edges of the positive electrode active material layer on the positive electrode collector layer side.

Consequently, when the all-solid-state secondary battery is being charged, electrons from the positive electrode active material at the excess portions are unlikely to be donated and lithium ions are less likely to be generated at those portions. This will inhibit concentration of lithium ion near the outer edges at the interface between the positive electrode active material layer and the solid electrolyte layer.

The all-solid-state secondary battery of the disclosure therefore has high durability since generation of lithium dendrites by repeated use is inhibited.

This will be more concretely described with reference to FIG. 1 and FIG. 2.

FIG. 1 is a cross-sectional view of an all-solid-state secondary battery 1 according to a first embodiment of the disclosure in the stacking direction.

As shown in FIG. 1, the all-solid-state secondary battery 1 according to the first embodiment of the disclosure has a positive electrode collector layer 10, a positive electrode layer 20, a solid electrolyte layer 30, a negative electrode layer 40 and a negative electrode collector layer 50 stacked in that order. The positive electrode layer 20 has a positive electrode active material layer 23 and an insulating layer 25 disposed around the perimeter edges of the positive electrode active material layer 23. As seen from the stacking direction of the all-solid-state secondary battery 1, the outer edges 23a of the positive electrode active material layer 23 on the solid electrolyte layer 30 side are further inward than the outer edges 23b of the positive electrode active material layer 23 on the positive electrode collector layer 10 side. Also as seen from the stacking direction, the outer edges 10a of the positive electrode collector layer 10 are further inward than the outer edges 23b of the positive electrode active material layer 23 on the positive electrode collector layer 10 side and further outward than the outer edges 23a of the positive electrode active material layer 23 on the solid electrolyte layer 30 side.

The positive electrode active material layer 23 has excess portions 23c between the edge 23b of the positive electrode active material layer 23 on the positive electrode collector layer 10 side and the edge 23a of the positive electrode active material layer 23 on the solid electrolyte layer 30 side. In the all-solid-state secondary battery 1 according to the first embodiment of the disclosure shown in FIG. 1, the outer edges 10a of the positive electrode collector layer 10 are further inward than the outer edges 23b of the positive electrode active material layer 23 on the positive electrode collector layer 10 side. As seen from the stacking direction, therefore, the excess portions 23c have portions 23d that do not overlap with the positive electrode collector layer 10 and portions 23e that overlap with the positive electrode collector layer 10.

Figure 2:
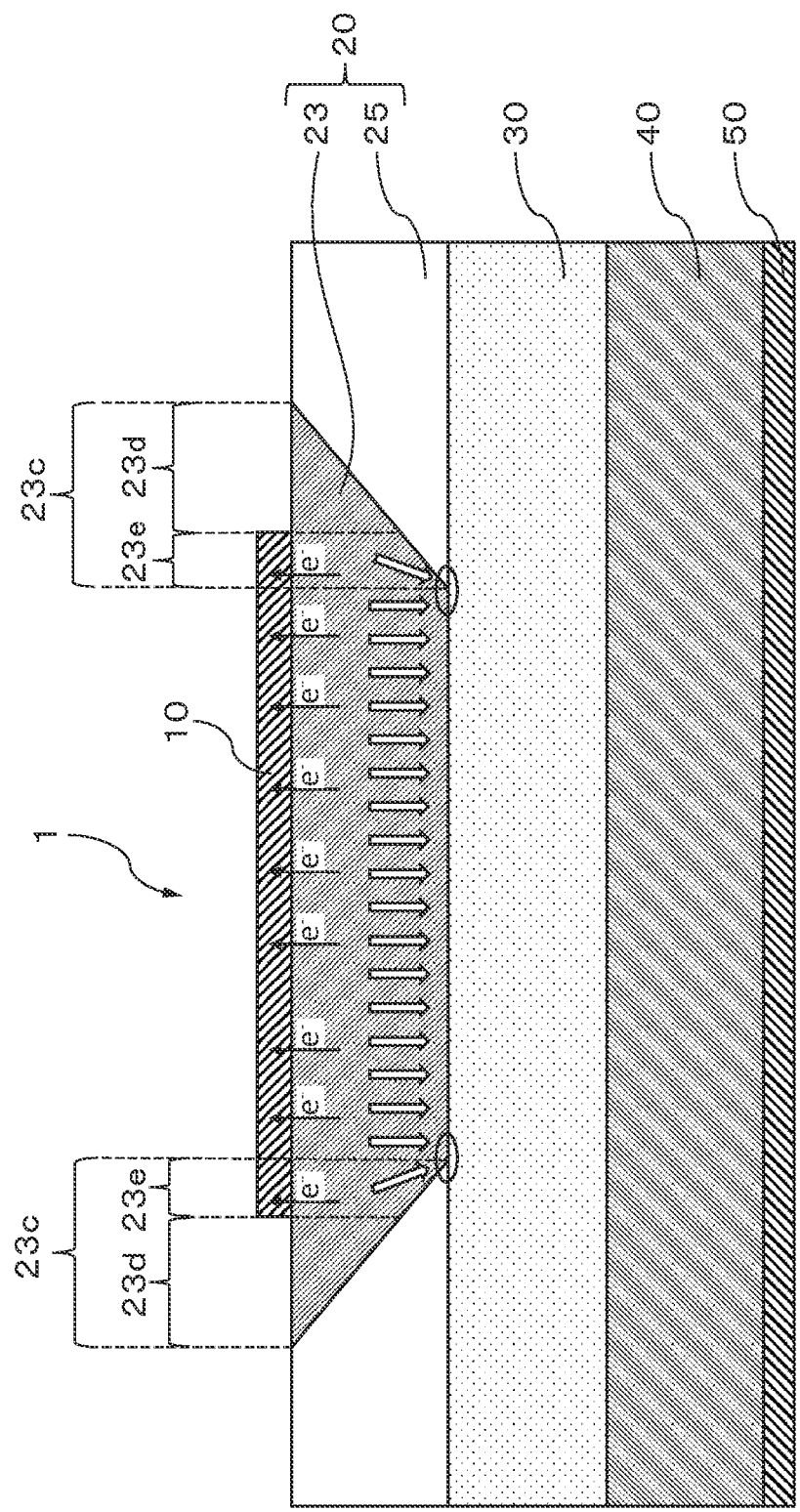
FIG. 2 is a schematic diagram of an all-solid-state secondary battery 1 according to the first embodiment of the disclosure showing its charging state.

FIG. 2 is a schematic diagram of an all-solid-state secondary battery 1 according to the first embodiment of the disclosure showing its charging state.

As shown in FIG. 2, upon charging of the all-solid-state secondary battery 1 according to the first embodiment of the disclosure, electrons migrate from the positive electrode active material in the positive electrode active material layer 23 toward the positive electrode collector layer 10, as indicated by the black arrows. At the same time, lithium ions migrate from the positive electrode active material in the positive electrode active material layer 23 toward the negative electrode layer 40, as indicated by the white arrows.

In the all-solid-state secondary battery 1 according to the first embodiment of the disclosure, electrons migrate from the positive electrode active material toward the positive electrode collector layer 10 at the portions 23e of the excess portions 23c that are covered by the positive electrode collector layer 10, while lithium ions migrate from the positive electrode active material in the positive electrode active material layer 23 toward the negative electrode layer 40 as indicated by the white arrows. At the portions 23d of the excess portions 23c that are not covered by the positive electrode collector layer 10, however, electrons are less likely to migrate from the positive electrode active material toward the positive electrode collector layer 10 and therefore lithium ions are less likely to be generated at those sections.

As a result, the all-solid-state secondary battery 1 according to the first embodiment of the disclosure has a reduced degree of lithium ion concentration near the outer edges at the interface between the positive electrode active material layer 23 and the solid electrolyte layer 30, and more specifically at the portions surrounded by the circles, compared to the all-solid-state secondary battery 2 which is different from the embodiment of the disclosure. This inhibits generation of lithium dendrites 100 directly under the areas of the negative electrode layer 40 near the outer edges at the interface between the positive electrode active material layer 23 and solid electrolyte layer 30.

The all-solid-state secondary battery 1 according to the first embodiment of the disclosure therefore has high durability since generation of lithium dendrites 100 by repeated use is inhibited.

As seen from the stacking direction of the all-solid-state secondary battery, the outer edges of the positive electrode collector layer may be further inward than the outer edges of the positive electrode active material layer on the solid electrolyte layer side.

When the outer edges of the positive electrode collector layer are further inward than the outer edges of the positive electrode active material layer on the solid electrolyte layer side, the portions at the outer edges of the positive electrode active material layer on the solid electrolyte layer side do not overlap with the positive electrode collector layer as seen from the stacking direction of the all-solid-state secondary battery. Consequently, when the all-solid-state secondary battery is being charged, generation of lithium ions is further inhibited at the regions between the edges of the positive electrode active material layer on the positive electrode collector layer side and the edges of the positive electrode active material layer on the solid electrolyte layer side, i.e. at the excess portions. This further inhibits concentration of lithium ion near the outer edges at the interface between the positive electrode active material layer and the solid electrolyte layer. It is possible to achieve even higher durability as a result.

This will now be more concretely described with reference to FIG. 5 and FIG. 6.

Figure 5:
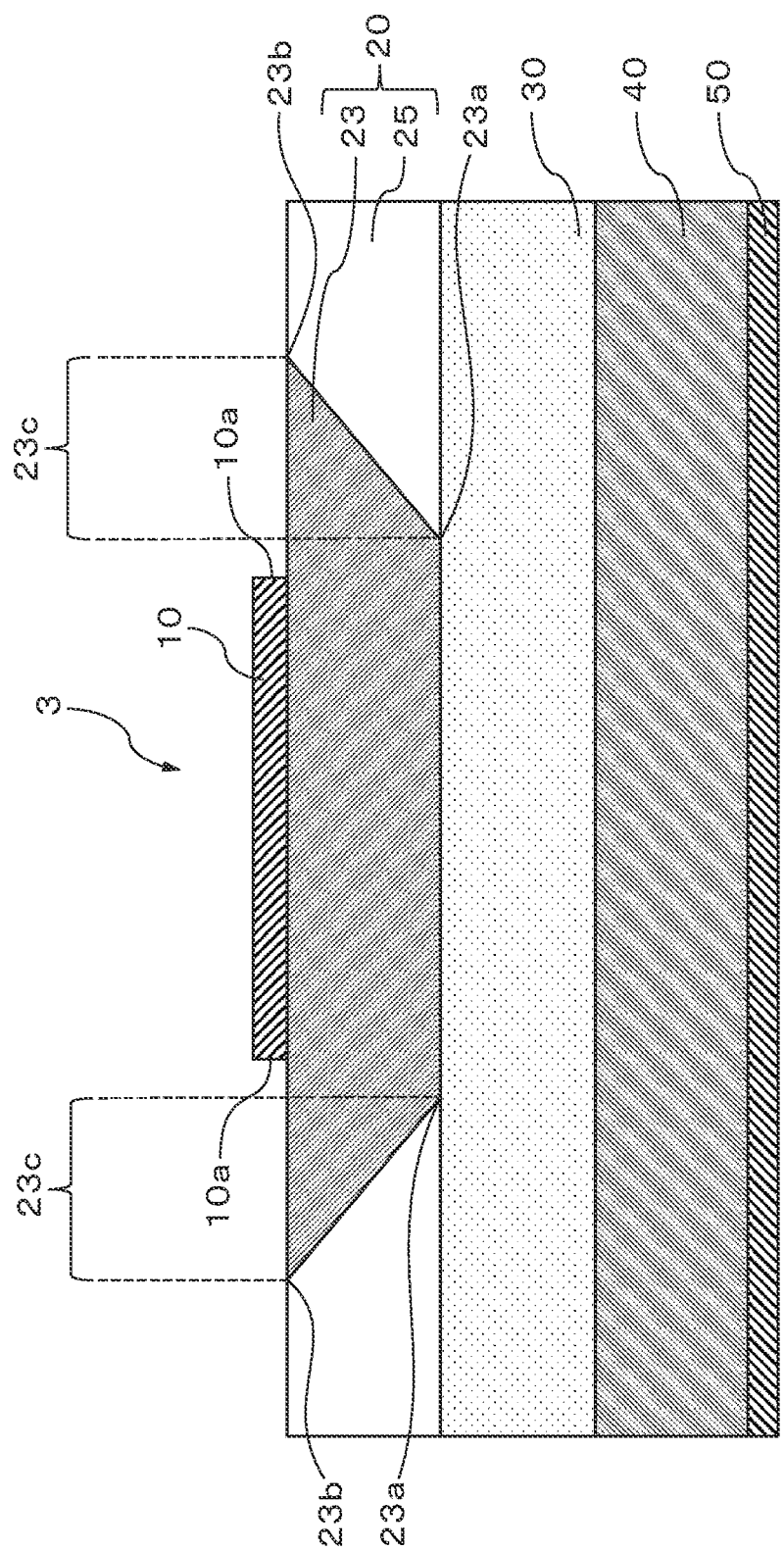
FIG. 5 is a cross-sectional view of an all-solid-state secondary battery 3 according to a second embodiment of the disclosure in the stacking direction.

As shown in FIG. 5, in the all-solid-state secondary battery 3 according to the second embodiment of the disclosure, the outer edges 10a of the positive electrode collector layer 10 are further inward than the outer edges 23a of the positive electrode active material layer 23 on the solid electrolyte layer 30 side. Except for this aspect, the construction of the all-solid-state secondary battery 3 according to the second embodiment of the disclosure is the same as the all-solid-state secondary battery 1 according to the first embodiment of the disclosure shown in FIG. 1.

In the all-solid-state secondary battery 3 according to the second embodiment of the disclosure, the outer edges 10a of the positive electrode collector layer 10 are further inward than the outer edges 23a of the positive electrode active material layer 23 on the solid electrolyte layer 30 side. As seen from the stacking direction, therefore, the excess portions 23c do not have portions overlapping with the positive electrode collector layer 10.

Figure 6:
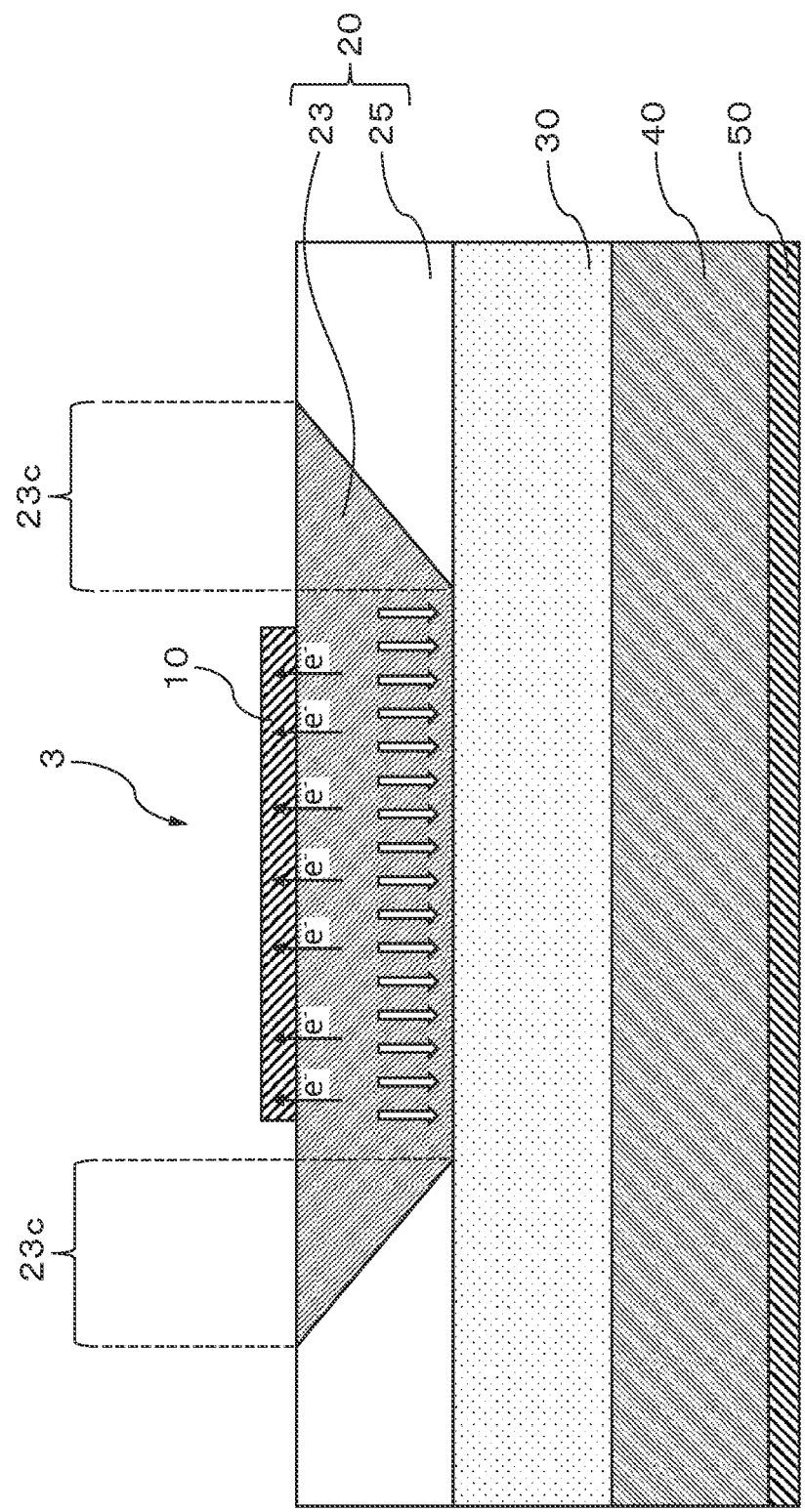
FIG. 6 is a schematic diagram of an all-solid-state secondary battery 3 according to the second embodiment of the disclosure showing its charging state.

FIG. 6 is a schematic diagram of an all-solid-state secondary battery 3 according to the second embodiment of the disclosure showing its charging state.

As shown in FIG. 6, upon charging of the all-solid-state secondary battery 3 according to the second embodiment of the disclosure, electrons migrate from the positive electrode active material in the positive electrode active material layer 23 toward the positive electrode collector layer 10, as indicated by the black arrows. At the same time, lithium ions migrate from the positive electrode active material in the positive electrode active material layer 23 toward the negative electrode layer 40, as indicated by the white arrows.

In the all-solid-state secondary battery 3 according to the second embodiment of the disclosure, the excess portions 23c do not include any portions that overlap with the positive electrode collector layer 10. At the excess portions 23c, therefore, electrons are less likely to migrate from the positive electrode active material toward the positive electrode collector layer 10, and therefore lithium ions are less likely to be generated at those sections.

As a result, in the all-solid-state secondary battery 3 according to the second embodiment of the disclosure the degree of lithium ion concentration is further reduced near the outer edges at the interface between the positive electrode active material layer 23 and the solid electrolyte layer 30, and more specifically at the portions surrounded by the circles in FIG. 4. This further inhibits generation of lithium dendrites 100 directly under the areas of the negative electrode layer 40 near the outer edges at the interface between the positive electrode active material layer 23 and solid electrolyte layer 30.

The all-solid-state secondary battery 3 according to the second embodiment of the disclosure therefore has even higher durability since generation of lithium dendrites 100 by repeated use is further inhibited.

In an arbitrary cross-section in the stacking direction of the all-solid-state secondary battery of the disclosure, with x mm denoting the shortest distance in the direction of the plane formed by an extension of the positive electrode active material layer on the positive electrode collector layer side and an extension of the positive electrode collector layer, and y mm denoting the shortest distance in the direction of the plane formed by an extension of the positive electrode active material layer on the positive electrode collector layer side and an extension of the positive electrode active material layer on the solid electrolyte layer side, the following inequality (1) may be satisfied.

$$\text{Electron conductivity of positive electrode active material layer } (mS/cm) \times (x - y)/\text{lithium ion conductivity of positive electrode active material layer } (mS/cm) \leq 450.0 \quad (1)$$

In the inequality, $x>0.0$, $y>0.0$ and $x-y>0.0$.

Figure 7:
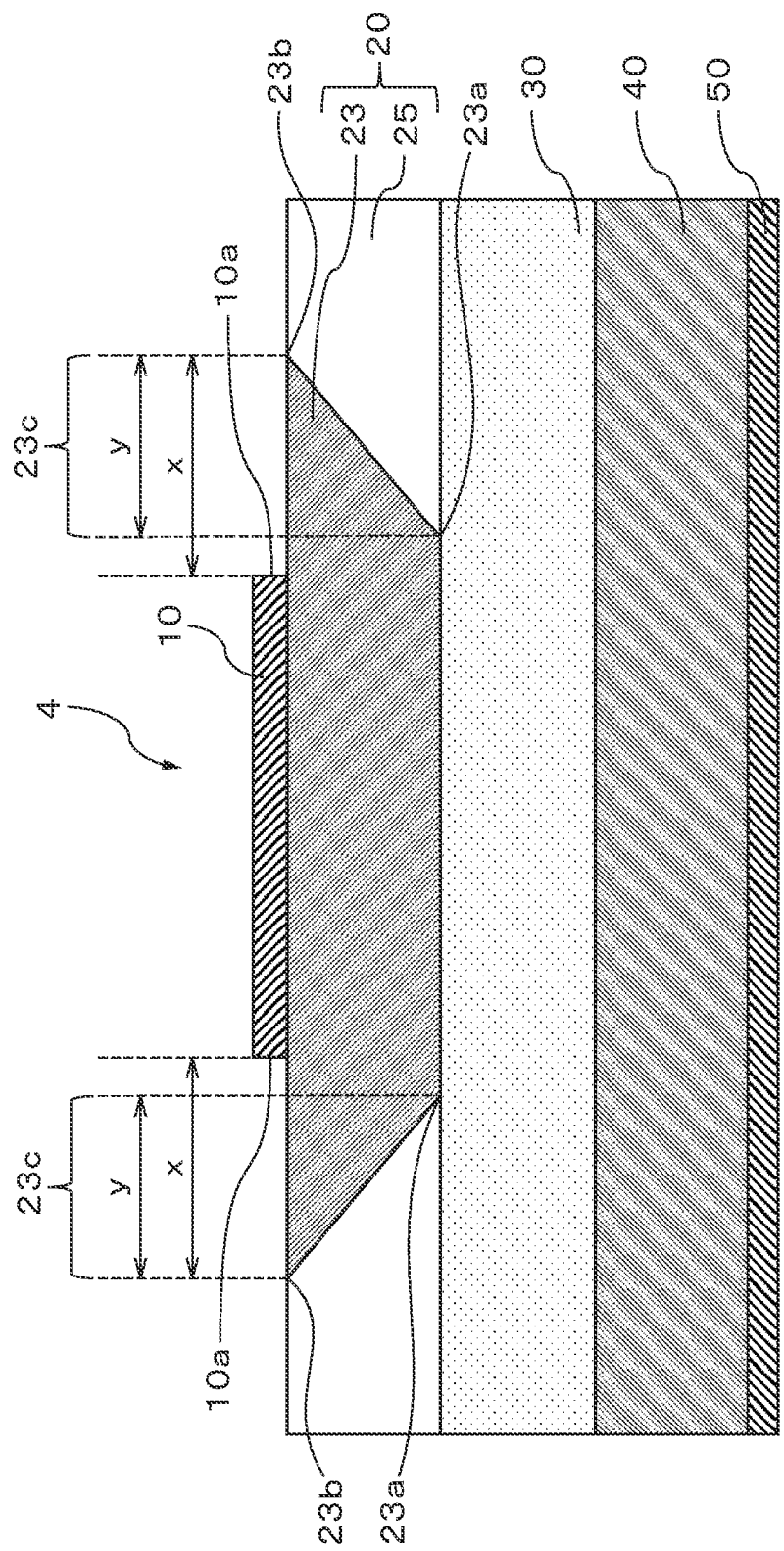
FIG. 7 is a cross-sectional view of an all-solid-state secondary battery 4 according to a third embodiment of the disclosure in the stacking direction.

More specifically, as shown in FIG. 7 for example, in an arbitrary cross-section of the all-solid-state secondary battery 4 in the stacking direction, inequality (1) above may be satisfied where x mm denotes the shortest distance in the direction of the plane formed by the outer edges 23b of the positive electrode active material layer 23 on the positive electrode collector layer 10 side and the outer edges 10a of the positive electrode collector layer 10, and y mm denotes the shortest distance in the direction of the plane formed by the outer edges 23b of the positive electrode active material layer 23 on the positive electrode collector layer 10 side and the outer edges 23a of the positive electrode active material layer 23 on the solid electrolyte layer 30 side.

The relationship $5.0>x>0.0$ may also hold in the inequality. The variable x may be greater than 0.0, 0.1 or greater, 0.5 or greater or 1.0 or greater, and 5.0 or lower, 4.0 or lower, 3.0 or lower or 2.0 or lower.

The relationship 5.0>y>0.0 may also hold in the inequality. The variable y may be greater than 0.0, 0.1 or greater, 0.5 or greater or 1.0 or greater, and 5.0 or lower, 4.0 or lower, 3.0 or lower or 2.0 or lower.

The sizes of x and y can be adjusted during formation of the positive electrode active material layer. For example, the method for forming the positive electrode active material layer may be one in which a positive electrode active material layer obtained by coating and drying a positive electrode active material slurry onto a transfer substrate is transferred onto a solid electrolyte layer. In this type of method, the viscosity of the slurry and/or the surface tension of the dispersing medium may be appropriately adjusted to adjust the numerical sizes of x and y.

If the all-solid-state secondary battery of the disclosure satisfies inequality (1) it will be possible to further increase the durability. Without being limited to any particular principle, it is believed that the principle by which the durability is increased by satisfying inequality (1) is as follows.

In an all-solid-state secondary battery where the outer edges of the positive electrode collector layer are further inward than the outer edges of the positive electrode active material layer on the solid electrolyte layer side, the excess portions do not have portions that overlap with the positive electrode collector layer as seen from the stacking direction.

The present inventors have found that electrons can migrate from the excess portions to the positive electrode collector layer and lithium ions can migrate to the negative electrode layer side in this type of all-solid-state secondary battery as well, depending on the difference between the shortest distance in the direction of the plane formed by an extension of the positive electrode active material layer on the positive electrode collector layer side and an extension of the positive electrode collector layer, and the shortest distance in the direction of the plane formed by an extension of the positive electrode active material layer on the positive electrode collector layer side and an extension of the positive electrode active material layer on the solid electrolyte layer side, and also depending on the magnitudes of the electron conductivity and lithium ion conductivity.

It was also found that if the relationship of inequality (1) is satisfied by the difference between the shortest distance in the direction of the plane formed by an extension of the positive electrode active material layer on the positive electrode collector layer side and an extension of the positive electrode collector layer, and the shortest distance in the direction of the plane formed by an extension of the positive electrode active material layer on the positive electrode collector layer side and an extension of the positive electrode active material layer on the solid electrolyte layer side, as well as the electron conductivity and lithium ion conductivity, then generation of lithium dendrites can be still further inhibited and even higher durability can be obtained.

(Electron Conductivity)

The term "electron conductivity", for the purpose of the disclosure, means the ease with which electrons pass in the depthwise direction of the positive electrode active material layer, or in other words, the ease with which electrons pass from the positive electrode current collector side to the negative electrode current collector side or from the negative electrode current collector side to the positive electrode current collector side of the positive electrode active material layer, and it is believed that the conductive aid and positive electrode active material are the main contributors to electron conductivity.

According to the present disclosure, measurement of the electron conductivity $\gamma^e$ (S/m) of the positive electrode active material layer can be carried out in the following manner. Specifically, using any method and procedure, an electron conductivity measuring stack is fabricated by sandwiching a positive electrode active material layer having the same composition as the positive electrode active material layer of the all-solid-state secondary battery of the disclosure, between two positive electrode collector layers and pressing them using a die having an arbitrary area A (cm$^2$).

The thickness (μm) of the stack may be measured and the thicknesses (μm) of the two positive electrode collector layers subtracted from that value to calculate the thickness L (μm) of the positive electrode active material layer.

The area A (cm$^2$) of the die used may be considered to be the positive electrode area A (cm$^2$).

Next, a direct current (for example, 1 mA) is applied between one current collector and the other current collector layer of the sample for a fixed period of time (for example, 30 seconds), the current I (mA) and voltage drop ΔE (mV) are measured, and the resistance value R (Ω)=ΔE/I is calculated from those values. The measurement may be conducted while maintaining a constant temperature such as 25° C.

Based on the thickness L (μm), positive electrode area A (cm$^2$) and resistance value (Ω) of the positive electrode active material layer obtained in this manner, it is possible to calculate the electron conductivity $\gamma^e$ (S/m) by the following formula (2).

[Mathematical Formula 1]

$$\gamma^e\left(\frac{S}{m}\right) = \frac{L(\mu m) \times 10^{-2}}{R(\Omega) \times A(\text{cm}^2)} \quad (2)$$

The electron conductivity may be 1.000 to 200.000 mS/cm. The electron conductivity may be 1.000 mS/cm or greater, 5.000 mS/cm or greater, 10.000 mS/cm or greater or 50.000 mS/cm or greater, and 200.000 mS/cm or lower, 150.000 mS/cm or lower, 100.000 mS/cm or lower or 75.000 mS/cm or lower.

(Lithium Ion Conductivity)

The term "lithium ion conductivity", for the purpose of the disclosure, means the ease with which lithium ions pass in the depthwise direction of the positive electrode active material layer, or in other words, the ease with which lithium ions pass from the positive electrode collector layer side to the negative electrode collector layer side or from the negative electrode collector layer side to the positive electrode collector layer side in the positive electrode active material layer, and it is believed that the solid electrolyte is the main contributor.

According to the present disclosure, measurement of the lithium ion conductivity $\gamma^{Li}$ (S/m) of the positive electrode active material layer can be carried out in the following manner. Specifically, using any method and procedure, the positive electrode collector layer, a positive electrode active material layer, a solid electrolyte layer, the positive electrode active material layer whose lithium ion conductivity is to be measured, a solid electrolyte layer, a negative electrode active material layer and the negative electrode collector layer are stacked in that order, and a die having an arbitrary area A (cm$^2$) is used for pressing to produce a stack for measurement of the lithium ion conductivity.

The positive electrode active material layer whose lithium ion conductivity is to be measured may be a positive electrode active material layer having the same composition as the positive electrode active material layer of the all-solid-state secondary battery of the disclosure.

Also, another stack, having the same structure but having the positive electrode active material layer whose lithium ion conductivity is to be measured removed from the stack, is produced by the same method and used as a stack for reference.

By subtracting the thickness (μm) of the reference stack from the thickness (μm) of the obtained measuring stack, it is possible to calculate the thickness L (μm) of the positive electrode active material layer whose lithium ion conductivity is to be measured. The area A (cm$^2$) of the die used may be considered to be the positive electrode area A (cm$^2$).

Next, a direct current (for example, 1 mA) is applied between the positive electrode collector layer and the negative electrode collector layer of the measuring stack for a fixed period of time (for example, 30 seconds), the current I (mA) and voltage drop ΔE (mV) are measured, and the resistance value R (Ω)=ΔE/I is calculated. The resistance value R (Ω) of the reference stack is measured in the same manner. The measurement may be conducted while maintaining a constant temperature such as 25° C.

The measuring stack has a structure in which the positive electrode active material layer whose lithium ion conductivity is to be measured is sandwiched between two solid electrolyte layers, as described above. Since the solid electrolyte layer may have virtually no electron conductivity, presumably only lithium ions are being conducted in the positive electrode active material layer to be measured during application of the direct current. Thus, by subtracting the resistance value of the reference stack from the resistance value of the obtained measuring stack, it is possible to calculate the lithium ion resistance value $R^{Li}$ (Ω) of the positive electrode active material layer whose lithium ion conductivity is to be measured.

From the thickness L (μm), positive electrode area A (cm$^2$) and lithium ion resistance value $R^{Li}$ (Ω) of the positive electrode active material layer whose lithium ion conductivity is to be measured, it is possible to calculate the lithium ion conductivity $\gamma^{Li}$ (S/m) by the following formula (3).

[Mathematical Formula 2]

$$\gamma^{Li}\left(\frac{S}{m}\right) = \frac{L(\mu m) \times 10^{-2}}{R^{Li}(\Omega) \times A(cm^2)} \quad (3)$$

The lithium ion conductivity may be 0.001 to 0.500 mS/cm. The lithium ion conductivity may be 0.001 mS/cm or greater, 0.010 mS/cm or greater, 0.050 mS/cm or greater or 0.100 mS/cm or greater, and 0.500 mS/cm or lower, 0.400 mS/cm or lower, 0.300 mS/cm or lower or 0.200 mS/cm or lower.

<Positive Electrode Collector Layer>

The outer edges of the positive electrode collector layer are further inward than the outer edges of the positive electrode active material layer on the positive electrode collector layer side.

The material used in the positive electrode collector layer is not particularly restricted, and any one that can be used in an all-solid-state battery may be employed as appropriate.

For example, the material used in the positive electrode collector layer may be, but is not limited to, SUS, aluminum, copper, nickel, iron, titanium or carbon. The material of the positive electrode collector layer may be aluminum.

The form of the positive electrode collector layer is not particularly restricted and may be, for example, a foil, sheet, mesh or the like. A foil may be among these.

<Positive Electrode Layer>

The positive electrode layer has an insulating layer disposed around the perimeter edges of the positive electrode active material layer and positive electrode active material layer.

<Positive Electrode Active Material Layer>

As seen from the stacking direction of the all-solid-state secondary battery of the disclosure, the outer edges of the positive electrode active material layer on the solid electrolyte layer side are further inward than the outer edges of the positive electrode active material layer on the positive electrode collector layer side.

A positive electrode active material layer of this type can be formed, for example, by coating and drying a positive electrode active material slurry onto a transfer substrate and transferring it onto a solid electrolyte layer. This is because when a positive electrode active material slurry is coated and dried onto a transfer substrate, the portions of the outer edges on the solid electrolyte layer side of the positive electrode active material layer that is formed become rounded, depending on the viscosity of the slurry and the surface tension of the dispersing medium. The transfer substrate may also be concomitantly used as the positive electrode collector layer.

The method of forming a positive electrode active material layer of this type is not limited to the method described above.

The positive electrode active material layer also includes at least a positive electrode active material, and it may further include the solid electrolyte described below. In addition, it may include additives used in positive electrode active material layers for all-solid-state batteries, such as conductive aids and binders, for example, depending on the application and the purpose of use.

The material of the positive electrode active material is not particularly restricted. Examples for the positive electrode active material include, but are not limited to, heterogenous element-substituted Li—Mn spinel having a composition represented by lithium cobaltate (LiCoO$_2$), lithium nickelate (LiNiO$_2$), lithium manganate (LiMn$_2$O$_4$), LiCo$_{1/3}$Ni$_{1/3}$Mn$_{1/3}$O$_2$ and Li$_{1+x}$Mn$_{2-x-y}$M$_y$O$_4$ (where M is one or more metal elements selected from among Al, Mg, Co, Fe, Ni and Zn).

The positive electrode active material may also have a covering layer. The covering layer may be a covering layer of an oxide such as lithium niobate, for example. Such a covering layer may be provided to increase the lithium ion conductivity, for example.

The conductive aid is not particularly restricted. For example, the conductive aid may be, but is not limited to, a carbon material such as VGCF (Vapor Grown Carbon Fibers) or carbon nanofibers, or a metal material.

The binder is also not particularly restricted. Examples for the binder include, but are not limited to, materials such as polyvinylidene fluoride (PVdF), carboxymethyl cellulose (CMC), butadiene rubber (BR) and styrene-butadiene rubber (SBR), or combinations thereof.

<Insulating Layer>

The insulating layer is disposed around the perimeter edges of the positive electrode active material layer as seen from the stacking direction of the all-solid-state secondary battery.

The insulating layer has one side in contact with the positive electrode collector layer and the other side in contact with the solid electrolyte layer.

The insulating layer is a layer made of an insulating material. The insulating material used may be any insulating material that can withstand environments in which all-solid-state secondary batteries are used. Examples of such materials include insulating resin materials, and more specifically thermoplastic resins such as polypropylene(PP), polyvinylidene chloride (PVDC), polyvinylidene fluoride (PVDF), polycarbonate (PC) or polyether imide (PEI), rubber materials such as acrylonitrile-butadiene rubber (ABR) or butadiene rubber (BR), and non-conductive binders such as epoxy or acrylic binders. Other materials that may be used include insulating metal oxides, and more specifically alumina, zirconia, calcium oxide or magnesium oxide. Any of the aforementioned materials may also be used in arbitrary combinations as the insulating material.

<Solid Electrolyte Layer>

The solid electrolyte layer includes at least a solid electrolyte. The solid electrolyte layer may include a binder or the like if necessary, in addition to a solid electrolyte. The binder may be selected with reference to the above description for the positive electrode active material layer.

The material of the solid electrolyte is not particularly restricted, and it may be any material that can be used as a solid electrolyte for an all-solid-state battery. For example, the solid electrolyte may be a sulfide solid electrolyte, an oxide solid electrolyte or a polymer electrolyte, although this is not limitative.

Examples of sulfide solid electrolytes include, but are not limited to, sulfide-based amorphous solid electrolytes, sulfide-based crystalline solid electrolytes and argyrodite solid electrolytes. Specific examples of sulfide solid electrolytes include, but are not limited to, $Li_2S$—$P_2S_5$ ($Li_7P_3S_{11}$, $Li_3PS_4$, $Li_8P_2S_9$), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$ ($Li_{13}GeP_3S_{16}$, $LiI_{10}GeP_2S_{12}$), $LiI$—$Li_2S$—$P_2O_5$, $LiI$—$Li_3PO_4$—$P_2S_5$ and $Li_{7-x}PS_{6-x}Cl_x$, as well as combinations thereof.

Examples of oxide solid electrolytes include, but are not limited to, $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$ and $Li_{3+x}PO_{4-x}N_x$(LiPON).

Polymer electrolytes include, but are not limited to, polyethylene oxide (PEO) and polypropylene oxide (PPO), and their copolymers.

The solid electrolyte may be glass or crystallized glass (glass ceramic).

<Negative Electrode Layer>

The negative electrode layer includes at least a negative electrode active material, and it may further include the solid electrolyte described above. In addition, it may include additives used in negative electrode layers of lithium ion secondary batteries, such as the aforementioned conductive aids and binders, for example, depending on the application and the purpose of use. The conductive aid and binder may be selected with reference to the above description for the positive electrode active material layer. A negative electrode layer is also sometimes referred to as a negative electrode active material layer.

The material for the negative electrode active material is not particularly restricted, and it may be lithium metal, or any material capable of occluding and releasing metal ions such as lithium ions. Examples of materials capable of occluding and releasing metal ions such as lithium ions include, but are not limited to, alloy-based negative electrode active materials and carbon materials, as negative electrode active materials.

Alloy-based negative electrode active materials are not particularly restricted, and examples include Si alloy-based negative electrode active materials and Sn alloy-based negative electrode active materials. Si alloy-based negative electrode active materials include silicon, silicon oxides, silicon carbides, silicon nitrides, and their solid solutions. A Si alloy-based negative electrode active material may also include elements other than silicon, such as Fe, Co, Sb, Bi, Pb, Ni, Cu, Zn, Ge, In, Sn and Ti, for example. Sn alloy-based negative electrode active materials include tin, tin oxides, tin nitrides, and their solid solutions. A Sn alloy-based negative electrode active material may also include elements other than tin, such as Fe, Co, Sb, Bi, Pb, Ni, Cu, Zn, Ge, In, Ti and Si, for example. Si alloy-based negative electrode active materials may be among these.

Carbon materials are not particularly restricted and include hard carbon, soft carbon and graphite, for example.

<Negative Electrode Collector Layer>

The materials and form for the negative electrode collector layer are not particularly restricted, and the same materials and form may be used as described above for the positive electrode collector layer. The material of the negative electrode collector layer may be copper. The layer form may be a foil.

EXAMPLES

Comparative Example 1 and Examples 1 to 13

Comparative Example 1

(Formation of Positive Electrode Active Material Layer)

Using a tumbling fluidized coating apparatus (product of Powrex Corp.), positive electrode active material particles (particles with $Li_{1.15}Ni_{1/3}Co_{1/3}Mn_{1/3}O_2$ as the main phase) were coated with lithium niobate in an air atmosphere and then fired in an air atmosphere to obtain positive electrode active material particles having a lithium niobate covering layer.

After adding polyvinylidene fluoride (PVdF), the positive electrode active material particles, a sulfide solid electrolyte ($Li_2S$—$P_2S_5$ glass ceramic), vapor-grown carbon fibers (VGCF) and a dispersing medium to a polypropylene container, they were stirred for 30 seconds with an ultrasonic disperser (UH-50 by SMT Co.).

The container was then shaken for 3 minutes with a shaker (TTM-1 by Sibata Scientific Technology, Ltd.), and then further stirred for 30 seconds with an ultrasonic disperser to obtain a positive electrode active material slurry.

Using an applicator, the positive electrode active material slurry was coated onto an aluminum foil as the transfer substrate by the blade method to a width of 72 mm. Adjustment was made for a positive electrode active material layer electron conductivity of 9 mS/cm and an ion conductivity of 0.10 mS/cm.

After allowing the slurry to naturally dry, it was dried for 30 minutes on a hot plate at 100° C. to obtain a positive electrode active material layer on the aluminum foil (transfer substrate). The film thickness was measured with a rotary caliper, and the shortest distance y in the direction of the plane formed by an extension of the positive electrode active material layer on the positive electrode collector layer side and an extension of the positive electrode active material layer on the solid electrolyte layer side was confirmed to be 2.0 mm.

The positive electrode collector layer side of the positive electrode active material layer is the side of the positive electrode active material layer that becomes the positive electrode collector layer side when the all-solid-state secondary battery is completed. The solid electrolyte layer side of the positive electrode active material layer is the side of the positive electrode active material layer that becomes the solid electrolyte layer side when the all-solid-state secondary battery is completed.

(Formation of Positive Electrode Layer)

PVdF and alumina (mean primary particle size: 1 μm) were stirred for 30 seconds in a polypropylene container using an ultrasonic disperser. The container was then shaken for 3 minutes in a shaker and further stirred for 30 seconds in an ultrasonic disperser for coating to an even thickness around the perimeter edges of the positive electrode active material layer. This resulted in formation of a positive electrode layer having an insulating layer disposed around the perimeter edges of the positive electrode active material layer and positive electrode active material layer.

(Formation of Negative Electrode Layer)

After adding PVdF, negative electrode active material particles (Si particles), a sulfide solid electrolyte and a dispersing medium to a polypropylene container, they were stirred for 30 minutes with an ultrasonic disperser to obtain a negative electrode active material slurry.

The negative electrode active material slurry was coated onto a copper foil as the negative electrode collector layer by the blade method using an applicator.

It was then allowed to naturally dry, and subsequently dried for 30 minutes on a hot plate at 100° C. to form a negative electrode layer on the copper foil.

A negative electrode layer was then formed in the same manner on the back side of the copper foil.

(Formation of Solid Electrolyte Layer)

After adding heptane as a dispersing medium, butadiene rubber (BR) and the same sulfide solid electrolyte as above to a polypropylene container, they were stirred for 30 seconds with an ultrasonic disperser. The container was then shaken for 30 minutes with a shaker and further stirred for 30 seconds with an ultrasonic disperser to obtain a solid electrolyte slurry.

Using an applicator, the solid electrolyte slurry was coated onto an aluminum foil as the transfer substrate by the blade method. After allowing the slurry to naturally dry, it was dried for 30 minutes on a hot plate at 100° C. to form a solid electrolyte layer on the aluminum foil as the transfer substrate.

(Formation of Positive Electrode Collector Layer)

For the conductive material, furnace black and PVdF were weighed out to 25:75 vol %. NMP was then added to prepare a carbon paste. This was coated onto one side of an aluminum foil to a film thickness of 2 μm and dried for 1 hour at 100° C. to obtain a carbon-coated foil.

The carbon-coated foil was then cut to 69.0 mm length× 91.0 mm width (carbon layer: 69.0 mm length×71.0 mm width), for use as a positive electrode collector layer.

(Assembly of All-Solid-State Secondary Battery)

The negative electrode layer and solid electrolyte layer were attached in direct contact and roll pressed at a linear pressure of 1.6 t/cm. The aluminum foil transfer substrate was then peeled off.

The positive electrode layer and solid electrolyte layer were then attached in direct contact and roll pressed at a linear pressure of 1.6 t/cm. After peeling of the aluminum foil transfer substrate, the stack was roll pressed at 165° C. at a linear pressure of 5.0 t/cm for consolidation.

BR was then used to attach the positive electrode collector layer onto the positive electrode layer to form an all-solid-state secondary battery. The formed all-solid-state secondary battery had the positive electrode collector layer covering the entire surface of the positive electrode layer, as seen from the stacking direction. In other words, the outer edges of the positive electrode collector layer were further outward than the outer edges of the positive electrode active material layer on the positive electrode collector layer side.

Ten of these all-solid-state secondary batteries were stacked, welding the terminals at the respective positive electrode collector layers and negative electrode collector layers, and then encapsulated into an exterior body to complete an all-solid-state secondary battery stack.

Examples 1 to 13

All-solid-state secondary battery stacks for Examples 1 to 13 were completed in the same manner as Comparative Example 1, except that the shortest distance x in the direction of the plane formed by an extension of the positive electrode active material layer on the positive electrode collector layer side and an extension of the positive electrode collector layer, and the shortest distance y in the direction of the plane formed by an extension of the positive electrode active material layer on the positive electrode collector layer side and an extension of the positive electrode active material layer on the solid electrolyte layer side, and also the electron conductivity and lithium ion conductivity of the positive electrode active material layer, were adjusted as indicated in Table 1 below in the column "Construction".

Charge-Discharge Test

Each of the all-solid-state secondary battery stacks was subjected to initial charging and then subjected to a 100-cycle durability test. Each all-solid-state secondary battery stack was then subjected to charge-discharge and the percentage of discharge capacity with respect to charge capacity (%) was measured.

A lower percentage of discharge capacity with respect to charge capacity indicates a greater degree of internal short circuiting of the all-solid-state secondary battery.

The initial charging was 20 hours of CCCV charge at 25° C., with a voltage of 4.35 V and a current of 0.1 C, and a cut current of 0.02 C, followed by a 10-minute pause, and then 20 hours of CCCV discharge with a voltage of 2.00 V, a current of 0.1 C and a cut current of 0.02 C. The CCCV discharge was also followed by a 10-minute pause.

For the durability test, 100 cycles were carried out at 25° C., with one cycle being CV charge for 612 seconds at a current of 4.0 C and CCCV discharge for 3.4 hours at a voltage of 1.50 V and a current of 0.2 C. A one-hour pause was also inserted between the CV charge and CCCV discharge. The final cycle was also followed by a one-hour pause.

Charge-discharge for measurement of the percentage of discharge capacity with respect to charge capacity (%) was under the same conditions as the initial charging.

Results

The constructions of the all-solid-state secondary battery stacks and the results of the charge-discharge tests are shown in Table 1.

TABLE 1

|  | Construction | | | | | Results Percentage of |
| --- | --- | --- | --- | --- | --- | --- |
|  | x (mm) | y (mm) | x − y (mm) | Electron conductivity (ms/cm) | Ion conductivity (ms/cm) | Electron conductivity (x − y)/ion conductivity | discharge capacity to charge capacity |
| Comp. Ex. 1 | — | 20 | — | 9 | 0.10 | — | 83.0 |
| Example 1 | 0.5 | 1.0 | −0.5 | 9 | 0.10 | −45.0 | 94.0 |
| Example 2 | 1.2 | 1.0 | 0.2 | 9 | 0.10 | 18.0 | 99.8 |
| Example 3 | 0.3 | 0.1 | 0.2 | 20 | 0.10 | 40.0 | 100.1 |
| Example 4 | 1.0 | 0.5 | 0.5 | 20 | 0.10 | 100.0 | 99.7 |
| Example 5 | 1.5 | 1.0 | 0.5 | 20 | 0.10 | 100.0 | 100.2 |
| Example 6 | 1.0 | 0.5 | 0.5 | 40 | 0.10 | 200.0 | 99.7 |
| Example 7 | 2.0 | 1.0 | 1.0 | 20 | 0.10 | 200.0 | 100.1 |
| Example 8 | 2.0 | 1.0 | 1.0 | 20 | 0.05 | 400.0 | 99.4 |
| Example 9 | 2.0 | 1.0 | 1.0 | 40 | 0.10 | 400.0 | 99.8 |
| Example 10 | 2.0 | 1.0 | 1.0 | 50 | 0.10 | 500.0 | 94.0 |
| Example 11 | 3.0 | 2.0 | 1.0 | 80 | 0.10 | 800.0 | 93.0 |
| Example 12 | 3.0 | 2.0 | 1.0 | 100 | 0.10 | 1000.0 | 93.0 |
| Example 13 | 3.0 | 1.0 | 2.0 | 100 | 0.10 | 2000.0 | 94.0 |

As shown in Table 1, in Examples 1 to 13 in which the all-solid-state secondary batteries had the outer edges of the positive electrode active material layer on the solid electrolyte layer side further inward than the outer edges of the positive electrode active material layer on the positive electrode collector layer side, and the outer edges of the positive electrode collector layer further inward than the outer edges of the positive electrode active material layer on the positive electrode collector layer side, as seen from the stacking direction, the percentages of discharge capacity with respect to charge capacity were all higher than 90%.

Even in Examples 2 to 9, where the ratio of electron conductivity (mS/cm) (x−y)/lithium ion conductivity (mS/cm) was 450.0 or lower, the percentages of discharge capacity with respect to charge capacity were all higher than 99.0%.

In contrast, in Comparative Example 1 where the outer edges of the positive electrode collector layer were further outward than the outer edges of the positive electrode active material layer on the positive electrode collector layer side, the percentage of discharge capacity with respect to charge capacity was 83.0%, which was a low value compared to Examples 1 to 13.

REFERENCE SIGNS LIST 1-4 All-solid-state secondary battery
10 Positive electrode collector layer
10a Outer edges of positive electrode collector layer
20 Positive electrode layer
23 Positive electrode active material layer
23a Outer edges of positive electrode active material layer on solid electrolyte layer side
23b Outer edges of positive electrode active material layer on positive electrode collector layer side
23c Excess portion
23d Portion not overlapping with positive electrode collector layer
23e Portion overlapping with positive electrode collector layer
25 Insulating layer
30 Solid electrolyte layer
40 Negative electrode layer
50 Negative electrode collector layer

What is claimed is:

1. An all-solid-state secondary battery comprising a positive electrode collector layer, a positive electrode layer, a solid electrolyte layer, a negative electrode layer and a negative electrode collector layer stacked in that order, wherein:
   the positive electrode layer has a positive electrode active material layer and an insulating layer disposed around perimeter edges of the positive electrode active material layer, and
   when the all-solid-state secondary battery is viewed from a stacking direction,
   outer edges of the positive electrode active material layer on solid electrolyte layer side are further inward than outer edges of the positive electrode active material layer on positive electrode collector layer side, and
   outer edges of the positive electrode collector layer are further inward than the outer edges of the positive electrode active material layer on the positive electrode collector layer side, wherein in an arbitrary cross-section in the stacking direction of the all-solid-state secondary battery, with:
      x mm denoting a shortest distance in the direction of a plane formed by an extension of the positive electrode active material layer on the positive electrode collector layer side and an extension of the positive electrode collector layer, and
      y mm denoting a shortest distance in the direction of a plane formed by an extension of the positive electrode active material layer on the positive electrode collector layer side and an extension of the positive electrode active material layer on the solid electrolyte layer side,
      the following inequality (1) is satisfied:

Electron conductivity of positive electrode active material layer $(mS/cm) \times (x − y)$/lithium ion conductivity of positive electrode active material layer $(mS/cm) \leq 450.0$     (1)

(where x>0.0, y>0.0 and x−y>0.0).

2. The all-solid-state secondary battery according to claim 1, wherein:
   when the all-solid-state secondary battery is viewed from the stacking direction, the outer edges of the positive electrode collector layer are further inward than the outer edges of the positive electrode active material layer on the solid electrolyte layer side.

3. The all-solid-state secondary battery according to claim 1, wherein $5.0>x>0.0$.

4. The all-solid-state secondary battery according to claim 1, wherein $5.0>y>0.0$.

5. The all-solid-state secondary battery according to claim 1, wherein the electron conductivity is 1.000 to 200.000 mS/cm.

6. The all-solid-state secondary battery according to claim 1, wherein the lithium ion conductivity is 0.001 to 0.500 mS/cm.

7. The all-solid-state secondary battery according to claim 1, wherein a ratio of a capacity of the negative electrode layer with respect to a capacity of the positive electrode layer is 2.5 or greater.

8. The all-solid-state secondary battery according to claim 1, which is a lithium ion secondary battery.

9. The all-solid-state secondary battery according to claim 8, wherein a voltage of the negative electrode layer in a fully charged state is 0.5 V v.s. Li/Li+ or lower.

* * * * *